United States Patent
Marusawa et al.

(10) Patent No.: US 9,214,263 B2
(45) Date of Patent: Dec. 15, 2015

(54) MAGNETITE-CONTAINING RESIN AND ELECTRONIC COMPONENT

(71) Applicant: MURATA MANUFACTURING CO., LTD., Kyoto-fu (JP)

(72) Inventors: Hiroshi Marusawa, Nagaokakyo (JP); Akio Hagiya, Nagaokakyo (JP)

(73) Assignee: Murata Manufacturing Co., Ltd., Kyoto (JP)

(*) Notice: Subject to any disclaimer, the term of this patent is extended or adjusted under 35 U.S.C. 154(b) by 393 days.

(21) Appl. No.: 13/789,486

(22) Filed: Mar. 7, 2013

(65) Prior Publication Data

US 2013/0182460 A1 Jul. 18, 2013

Related U.S. Application Data

(63) Continuation of application No. PCT/JP2011/069002, filed on Aug. 24, 2011.

(30) Foreign Application Priority Data

Sep. 9, 2010 (JP) ................................. 2010-201932
Feb. 22, 2011 (JP) ................................. 2011-035848

(51) Int. Cl.
*H01F 27/02* (2006.01)
*H01F 1/01* (2006.01)
(Continued)

(52) U.S. Cl.
CPC .............. *H01F 1/01* (2013.01); *C01G 49/0072* (2013.01); *C01G 49/06* (2013.01); *C01G 49/08* (2013.01); *H01F 1/37* (2013.01); *H01F 27/02* (2013.01); *C01P 2002/52* (2013.01); *C01P 2004/61* (2013.01); *C01P 2006/40* (2013.01); *C01P 2006/42* (2013.01); *H01F 1/344* (2013.01); *H01F 17/045* (2013.01);
(Continued)

(58) Field of Classification Search
CPC ......................... H01F 5/00; H01F 27/00–27/30
USPC ....................... 336/65, 83, 200, 210, 232–233
See application file for complete search history.

(56) References Cited

U.S. PATENT DOCUMENTS 7,362,201 B2 * 4/2008 Saegusa ................ H01F 27/022
                                                          336/90
7,427,909 B2 * 9/2008 Ono ...................... H01F 1/1475
                                                          336/90

(Continued)

FOREIGN PATENT DOCUMENTS

CN       1574122 A       2/2005
CN       1926936 A       3/2007
(Continued)

OTHER PUBLICATIONS

International Search Report; PCT/JP2011/069002; Nov. 29, 2011.
(Continued)

*Primary Examiner* — Tuyen Nguyen
(74) *Attorney, Agent, or Firm* — Studebaker & Brackett PC

(57) ABSTRACT

This disclosure provides a magnetic material-containing resin to be used for coating and forming cores. A magnetite-containing resin of the present invention includes a magnetite having a residual magnetic flux density of less than 15 $Am^2/kg$ and a coercive force of less than 12 kA/m. A coil is provided that has a structure in which by coating a winding with the magnetite-containing resin, a magnetite-containing resin layer is formed.

18 Claims, 2 Drawing Sheets

(51) Int. Cl.

| | | |
|---|---|---|
| *C01G 49/08* | (2006.01) | |
| *H01F 1/37* | (2006.01) | |
| *C01G 49/00* | (2006.01) | |
| *C01G 49/06* | (2006.01) | |
| H01F 1/34 | (2006.01) | |
| H01F 17/04 | (2006.01) | |
| H01F 17/06 | (2006.01) | |
| H01F 41/02 | (2006.01) | |
| H01F 3/10 | (2006.01) | |

(52) U.S. Cl.
CPC .......... *H01F 17/062* (2013.01); *H01F 41/0246* (2013.01); *H01F 2003/106* (2013.01); *H01F 2017/048* (2013.01)

(56) References Cited

U.S. PATENT DOCUMENTS

| | | | |
|---|---|---|---|
| 7,561,114 B2 | 7/2009 | Maezawa et al. | |
| 2005/0007232 A1 | 1/2005 | Ono et al. | |
| 2005/0012581 A1 | 1/2005 | Ono et al. | |
| 2005/0257854 A1* | 11/2005 | Maeda | H01F 41/0246 148/104 |
| 2007/0196671 A1 | 8/2007 | Kobayashi | |
| 2007/0252771 A1 | 11/2007 | Maezawa et al. | |
| 2012/0119869 A1* | 5/2012 | Yamamoto | H01F 27/255 336/212 |
| 2012/0313740 A1* | 12/2012 | Inaba | H01F 37/00 336/61 |

FOREIGN PATENT DOCUMENTS

| | | |
|---|---|---|
| CN | 101069461 A | 11/2007 |
| JP | 04-025102 A | 1/1992 |
| JP | 07-069643 A | 3/1995 |
| JP | 2000-269038 A | 9/2000 |
| JP | 2003-297642 A | 10/2003 |
| JP | 2004-203931 A | 7/2004 |
| JP | 2005-286190 A | 10/2005 |
| JP | 2005-286193 A | 10/2005 |
| JP | 2005-306642 A | 11/2005 |
| JP | 2006-294733 A | 10/2006 |
| WO | 2006/059771 A1 | 6/2006 |

OTHER PUBLICATIONS

Written Opinion of the Searching Authority; PCT/JP2011/069002; Nov. 29, 2011.

* cited by examiner

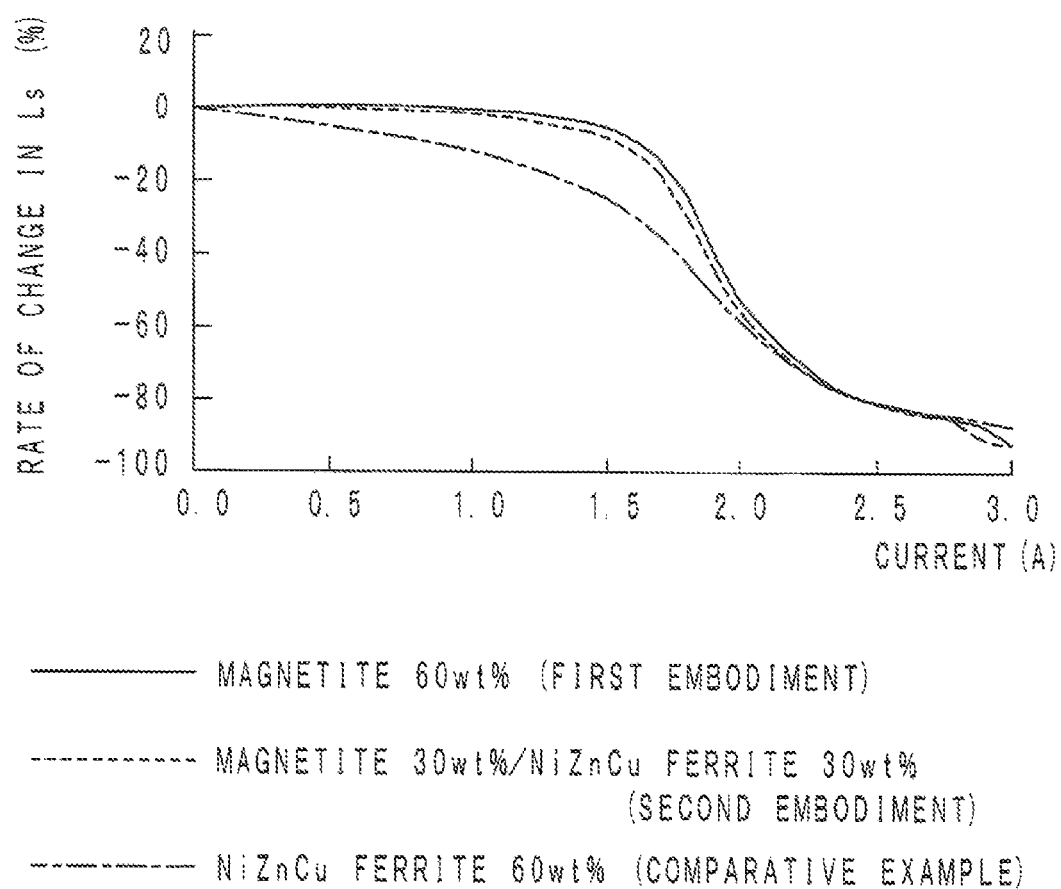

MAGNETITE-CONTAINING RESIN AND ELECTRONIC COMPONENT

CROSS REFERENCE TO RELATED APPLICATIONS

The present application is a continuation of International Application No. PCT/2011/069002 filed on Aug. 24, 2011, and claims priority to Japanese Patent Application No. 2011-035848 filed on Feb. 22, 2011, and Japanese Patent Application No. 2010-201932 filed Sep. 9, 2010, the entire contents of each of these applications being incorporated herein by reference in their entirety.

TECHNICAL FIELD

The technical field relates to a magnetite-containing resin, which is a resin that contains magnetite ($Fe_3O_4$). The technical field further relates to an electronic component, such as a coil or noise filter, which is coated with the magnetite-containing resin. Furthermore, the technical field relates to an electronic component, such as a coil or noise filter, which includes a core composed of the magnetite-containing resin.

BACKGROUND

In electronic components, such as coils and noise filters, in which a winding is provided around a core composed of a magnetic material, e.g., ferrite, the winding is often coated with a resin containing a powdery magnetic material composed of ferrite or the like in order to improve characteristics of the electronic components. For example, in a coil in which a winding is coated with a resin containing a magnetic material, a quasi-closed magnetic circuit is formed, thus increasing the inductance. Furthermore, the coating reinforces the strength of the core. Note that in some cases, instead of providing a winding, a spiral conductive pattern may be disposed on the outer peripheral surface of the core.

Furthermore, in some cases, a resin incorporated with magnetic material powder may be used as the core.

For example, Japanese Unexamined Patent Application Publication No. 2003-297642 (Patent Document 1) discloses a chip inductor which includes a core, a coil wound around the core, an external coating material integrally provided so as to cover the outer periphery of the core and the coil, and terminal electrodes. In the chip inductor of Patent Document 1, the core and the external coating material are each composed of a material prepared by incorporating functional material powder of a magnetic material having an average particle size of 1 to 10 μm into a resin. It is disclosed that it is possible to use, as the magnetic material, MnZn ferrite, NiZn ferrite, MnMgZn ferrite, NiCuZn ferrite (NiZnCu ferrite), Ba ferrite, $Fe_2O_3$, $Fe_3O_4$ (magnetite), or the like.

SUMMARY

In an aspect of the present disclosure, a magnetite-containing resin includes a resin and a powdery magnetic material incorporated into the resin, the magnetic material at least partially including a magnetite having a residual magnetic flux density of less than 15 $Am^2/kg$ and a coercive force of less than 12 kA/m.

In a more specific embodiment, the magnetite may have a particle size D50 of less than 1.0 μm and a particle size D90 of less than 2.0 μm.

Note that, in this application, when reference is made to the particle size of magnetite, in the case where the magnetite contained in the resin is in the form of an aggregate, the particle size refers to the primary particle size.

In another more specific embodiment, the magnetite-containing resin may contain, in addition to the magnetic material (which at least partially includes magnetite), a non-magnetic material. In this case, preferably, the particle size ratio of the magnetic material to the non-magnetic material represented by the formula: particle size D90 of the magnetic material/particle size D90 of the non-magnetic material is 0.4 or less.

In yet another more specific embodiment, in the case where a non-magnetic material is incorporated into the magnetite-containing resin, the non-magnetic material may be spherical silica.

In another aspect of the present disclosure, an electronic component has a structure in which a core is composed of the magnetite-containing resin, and a winding is wound around the core, or a pattern is disposed on the surface of the core.

BRIEF DESCRIPTION OF THE DRAWINGS

FIG. 3 is a graph showing direct current superposition characteristics of a coil according to the first exemplary embodiment, a coil according to a second exemplary embodiment, and a coil according to a comparative example.

DETAILED DESCRIPTION

Figure 1:
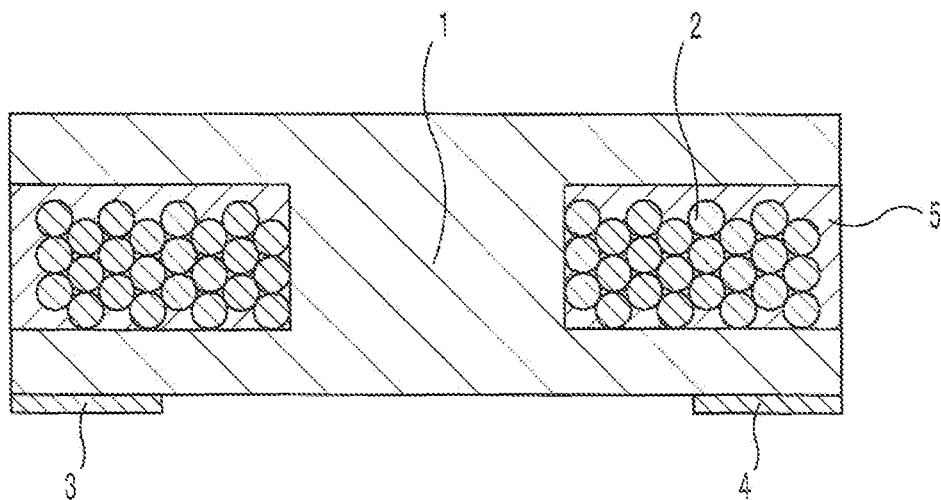
FIG. 1 is a cross-sectional view showing a coil according to a first exemplary embodiment.

Magnetite generally has a high residual magnetic flux density (Br) and a high coercive force (Hc). Therefore, in a coil in which a resin containing magnetite as a magnetic material is used as a core or a coil in which a core is coated with a resin containing magnetite as a magnetic material, the Q value is small, which is a problem. Consequently, from a practical standpoint, ferrite is mainly used as such a magnetic material to be incorporated into a resin, and magnetite is not used. For instance, note that ferrite powder is used in examples of Patent Document 1.

However, the inventors realized that in the case where a resin containing ferrite as a magnetic material is used, there is a possibility that, when a large DC superposition current flows through a coil, magnetic saturation will occur and the inductance will decrease steeply, thus adversely affecting the circuit. Accordingly, there is a need for a coil having an excellent direct current superposition characteristic in which even if a large DC superposition current flows, magnetic saturation is unlikely to occur and the inductance is unlikely to decrease.

Exemplary embodiments of the present disclosure that can address the above-described shortcomings will now be described.

First Exemplary Embodiment—Magnetite-Containing Resin

As a resin, for example, a bisphenol A epoxy resin is prepared. The resin is not limited to an epoxy resin, and may be a urethane resin or the like.

As a powdery magnetic material, magnetite ($Fe_3O_4$) is prepared. The magnetite to be used has a particle size D50 of less than 1.0 μm and a particle size D90 of less than 2.0 μm. From the viewpoint of dispersibility between the magnetite and the resin, the particle size D50 is preferably 0.1 μm or more. Here, a magnetite having a particle size D50 of 0.81 and a particle size D90 of 1.60 was prepared.

Note that the particle size is the value measured by a laser diffraction method. Specifically, after the powder was subjected to ultrasonic dispersion in an aqueous sodium hexametaphosphate solution, the particle size was measured with a micro-track analyzer manufactured by Horiba Ltd.

The saturation magnetization (Bs) of the magnetite was 90 $Am^2/Kg$. The residual magnetic flux density (Br) was 10.2 $Am^2/Kg$, and the coercive force (Hc) was 9.8 kA/m.

By stirring 40% by weight of the bisphenol A epoxy resin and 60% by weight of the magnetite, for example, with a planetary mixer for 5 to 8 hours, a magnetite-containing resin is produced.

In this embodiment, the composition ratio of the magnetite in the magnetite-containing resin is set at 60% by weight. Preferably, the composition ratio of the magnetic material is selected from the range of 50% to 90% by weight. When the composition ratio is less than 50% by weight, it is difficult for the magnetite-containing resin to exhibit a function of a magnetic material (e.g., a function of improving inductance). When the composition ratio exceeds 90% by weight, the resin component decreases, resulting in a brittle resin-cured product.

Coil Coated with Magnetite-Containing Resin

FIG. 1 shows a coil 100 as an electronic component according to the present embodiment.

The coil 100 has a structure in which a winding 2 is provided around a 3-mm square drum core 1, both ends of the winding 2 are connected to a pair of electrodes 3 and 4 disposed on the bottom of the drum core 1 in advance, and a magnetite-containing resin layer 5 is formed on the wiring 2.

The drum core 1 is, for example, composed of NiZnCu ferrite.

The wiring 2 is, for example, composed of an insulating film-coated Cu wire with a wire diameter of 0.2 mm, and is wound with 13 turns around the drum core 1.

The electrodes 3 and 4, for example, contain Ag as a main component.

The magnetite-containing resin layer 5 is formed by applying the magnetite-containing resin onto the wiring 2, followed by curing.

The coil 100 is, for example, produced by the method described below.

First, a drum core 1 is prepared. Specifically, first, calcined powder of ferrite, such as NiZnCu ferrite, is mixed with a binder or the like to form a ferrite slurry. The ferrite slurry is granulated, using a spray dryer or the like, to form ferrite granulated powder. Next, the granulated powder is press-formed into a compact. Lastly, the compact is subjected to debindering, and then fired with a predetermined profile to obtain a drum core 1.

Next, electrodes 3 and 4 are formed on the bottom of the drum core 1. Specifically, for example, an Ag paste is applied in a predetermined pattern onto the bottom, followed by baking at a predetermined temperature.

Next, a wiring 2 is provided around the drum core 1. Both ends of the wiring 2 are soldered to the electrodes 3 and 4.

Next, a magnetite-containing resin layer 5 is formed on the wiring 2. Specifically, first, a curing agent is mixed into the magnetite-containing resin according to the present disclosure, and the resulting mixture is applied onto the wiring 2. As the curing agent, for example, an amine-based curing agent is used. Regarding the composition ratio between the magnetite-containing resin and the curing agent, for example, 15 parts by weight of the curing agent is used relative to 100 parts by weight of the magnetite-containing resin. Lastly, the magnetite-containing resin is cured by heating to a predetermined temperature to form a magnetite-containing resin layer 5. Thereby, a coil 100 is completed.

The inductance and the Q value of the coil 100 according to the present embodiment were measured using an HP4291A manufactured by Hewlett Packard (HP). The inductance was 4.8 μH, and the Q value was 35.

In the coil 100, it was possible to obtain a large Q value of 35. The reason for this is believed to be that since the magnetite incorporated into the resin had a particle size D50 of 0.81 and a particle size D90 of 1.60, the residual magnetic flux density (Br) was small at 10.2 $Am^2/Kg$, and the coercive force (Hc) was small at 9.8 kA/m.

The magnetite-containing resin and the coil (electronic component) coated therewith according to the first exemplary embodiment have been described. However, embodiments consistent with the present disclosure are not limited to the above description, and various modifications can be made within the scope of the disclosure.

For example, the particle sizes of the magnetite incorporated into the resin are not limited those described above. The magnetite can have a particle size D50 of less than 1.0 μm and a particle size D90 of less than 2.0 μm.

Furthermore, the electronic component to be coated with the magnetite-containing resin is not limited to the coil, but, for example, may be a noise filter. Regarding the structure of the electronic component, instead of providing a winding on the core, a spiral conductive pattern may be disposed on the outer peripheral surface of the core. Furthermore, the electronic component may have a structure in which a substrate is used instead of the core, a conductive pattern is disposed on the substrate, and a magnetite-containing resin coating is applied thereon.

Second Exemplary Embodiment—Magnetite-Containing Resin

In a magnetite-containing resin according to the present disclosure, the magnetic material to be incorporated is not necessarily entirely composed of magnetite, but the magnetite may be partially replaced with another magnetic material.

In a magnetite-containing resin according to a second exemplary embodiment, a magnetic material to be incorporated into a resin is composed of half magnetite and half NiZnCu ferrite.

That is, 30% by weight of a magnetite with a particle size D50 of 0.81 and a particle size D90 of 1.60 (the same magnetite as that used in the first embodiment) and 30% by weight of a NiZnCu ferrite with a particle size D50 of 1.24 and a particle size D90 of 14.30 were incorporated into 40% by weight of a bisphenol A epoxy resin.

The magnetite-containing resin was produced in the same manner as that in the first embodiment.

Coil Coated with Magnetite-Containing Resin

A coil according to the second embodiment has the same structure as that of the coil 100 according to the first embodiment shown in FIG. 1 except for the magnetite-containing resin layer 5. The following description will be made also with reference to FIG. 1.

That is, in the coil according to the second embodiment, the magnetite-containing resin according to this embodiment containing a magnetic material composed of half magnetite and half NiZnCu ferrite is used for the magnetite-containing resin layer 5. In other respects, the coil has the same structure as that of the coil 100 according to the first embodiment.

The coil according to the second embodiment has an inductance of 4.7 to 4.9 μH and a Q value of 31 to 32, each of which is good.

In the second embodiment, magnetite and NiZnCu ferrite are incorporated into the epoxy resin, which is very desirable in terms of temperature characteristics. That is, magnetite has a high Curie temperature of 585° C., and the temperature characteristic of inductance of the epoxy resin including the magnetite tends to be positive. In contrast, NiZnCu ferrite has a low Curie temperature of 80° C. to 270° C., and it is possible to adjust so that the temperature characteristic of inductance of the epoxy resin including the NiZnCu ferrite tends to be negative. Consequently, by mixing the two materials, even if the temperature changes, the two temperature characteristics can cancel each other out, and it is possible to obtain a flat temperature characteristic of inductance. In order to achieve a flatter temperature characteristic of inductance, the composition ratio of the two materials may be adjusted.

Third Exemplary Embodiment—Magnetite-Containing Resin

In a third exemplary embodiment, the same magnetite-containing resin as that in the first embodiment was used.

That is, a magnetite-containing resin in which 40% by weight of a bisphenol A epoxy resin and 60% by weight of a magnetite with a particle size D50 of 0.81, a particle size D90 of 1.60, a saturation magnetization (Bs) of 90 $Am^2/Kg$, a residual magnetic flux density (Br) of 10.2 $Am^2/Kg$, and a coercive force (Hc) of 9.8 kA/m were mixed was used.

Coil Including Core Composed of Magnetite-Containing Resin

Figure 2:
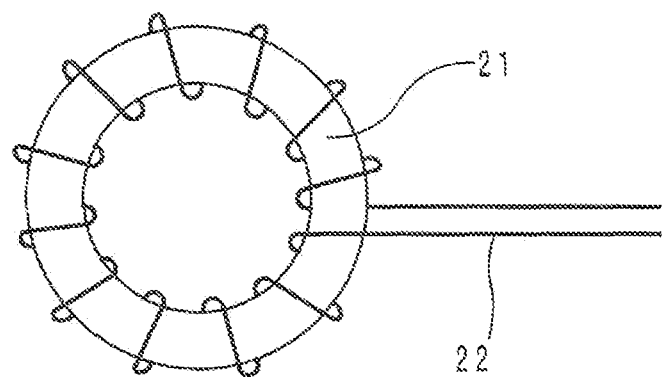
FIG. 2 is a plan view showing a coil according to a third exemplary embodiment.

FIG. 2 shows a coil 200 as an electronic component according to the present embodiment.

The coil 200 has a structure in which a wiring 22 is wound around a ring core 21.

The coil 200 according to the present embodiment is characterized in that the magnetite-containing resin described above is used for the ring core 21. In the coil 200, the wiring 22 is provided around the ring core 21 containing the magnetic material (magnetite), and thus the coil 200 is a closed magnetic circuit coil.

The ring core 21 has, for example, a cylindrical shape with an inside diameter of 7 mm, an outside diameter of 19 mm, and a height of 2 to 3 mm.

The wiring 22 is, for example, composed of an insulating film-coated Cu wire of 0.5 to 1.0 mm, and is wound with 25 turns around the ring core 21.

The coil 200 having such a structure is, for example, produced by the method described below.

First, a ring core 21 is formed. Specifically, the magnetite-containing resin is prepared, and a curing agent is mixed into the magnetite-containing resin. As the curing agent, for example, an amine-based curing agent is used. Regarding the composition ratio between the magnetite-containing resin and the curing agent, for example, 65 parts by weight of the curing agent is used relative to 100 parts by weight of the magnetite-containing resin. Next, the magnetite-containing resin into which the curing agent has been mixed is poured into a mold having a predetermined shape, heated to a predetermined temperature, defoamed, and cured. Thereby, a ring core 21 is obtained.

Next, a wiring 22 is wound around the ring core 21 to complete a coil 200.

The inductance and the Q value of the resulting coil 200 were measured. The inductance was 4.3 μH, and the Q value was 43.

In the coil 200, it was possible to obtain a large Q value of 43. The reason for this is believed to be that since the magnetite incorporated into the resin had a particle size D50 of 0.81 and a particle size D90 of 1.60, the residual magnetic flux density (Br) was small at 10.2 $Am^2/Kg$, and the coercive force (Hc) was small at 9.8 kA/m.

Fourth Exemplary Embodiment—Magnetite-Containing Resin

The magnetite-containing resin of the present disclosure may contain, in addition to the magnetic material which at least includes magnetite, a non-magnetic material.

In this case, preferably, the particle size ratio of the magnetic material to the non-magnetic material represented by the formula: particle size D90 of the magnetic material/particle size D90 of the non-magnetic material is 0.4 or less. Furthermore, the non-magnetic material is preferably spherical silica. In such a manner, as described above, cracks are unlikely to occur in the magnetite-containing resin after being cured.

Here, 60% by weight of a magnetite with a particle size D50 of 0.81 μm and a particle size D90 of 1.60 μm and 30% by weight of spherical silica with a particle size D50 of 6.0 μm and a particle size D90 of 14.7 μm were incorporated into 10% by weight of a bisphenol A epoxy resin. The particle size ratio of the magnetic material to the non-magnetic material represented by the formula: particle size D90 of the magnetic material/particle size D90 of the non-magnetic material is 0.11.

The magnetite-containing resin was produced in the same manner as that in the first embodiment.

The magnetite had a saturation magnetization (Bs) of 90 $Am^2/Kg$, a residual magnetic flux density (Br) of 10.2 $Am^2/Kg$, and a coercive force (Hc) of 9.8 kA/m.

In the present embodiment, the reason for incorporation of the non-magnetic material, such as spherical silica, in addition to the magnetic material including at least magnetite, is to prevent occurrence of cracks in the magnetite-containing resin after being cured as described above. Incorporation of the non-magnetic material is particularly important in the case where an electronic component, such as a coil, including the magnetite-containing resin of the present invention is used at high temperatures, for example, for in-vehicle use.

That is, in a thermal shock test at −40° C. to 85° C. with 1,000 cycles required for consumer electronic components, cracks do not occur even in the magnetite-containing resin according to the present disclosure that does not contain a non-magnetic material, such as spherical silica.

However, in a thermal shock test at −40° C. to 130° C. with 1,000 cycles required for electronic components used at high temperatures, for example, for in-vehicle use, there is a concern that cracks may occur unless a non-magnetic material, such as spherical silica, is incorporated into the resin such that the particle size ratio between the magnetic material and the non-magnetic material satisfies a predetermined value. Accordingly, the non-magnetic material is additionally incorporated.

Therefore, incorporation of the non-magnetic material is not an essential feature in an embodiment according to the present disclosure. In applications other than ones in which a thermal shock test at high temperatures is required, the magnetite-containing resin of the present disclosure that does not contain a non-magnetic material can be practically used satisfactorily.

Coil Coated with Magnetite-Containing Resin

A coil according to the fourth exemplary embodiment has the same structure as that of the coil 100 according to the first embodiment shown in FIG. 1 except for the magnetite-containing resin layer 5. The following description will be made also with reference to FIG. 1.

That is, in the coil according to the fourth embodiment, the magnetite-containing resin according to this embodiment containing magnetite and spherical silica is used for the magnetite-containing resin layer 5. In other respects, the coil has the same structure as that of the coil 100 according to the first embodiment.

The coil according to the fourth embodiment has an inductance of 4.7 to 4.9 µH and a Q value of 37 to 39, each of which is good.

In the fourth embodiment, in addition to the magnetic material (magnetite), the non-magnetic material (spherical silica) is incorporated into the epoxy resin, and the particle size ratio of the magnetic material to the non-magnetic material represented by the formula: particle size D90 of the magnetic material/particle size D90 of the non-magnetic material is 0.4 or less. Therefore, cracks are unlikely to occur in the magnetite-containing resin after being cured.

That is, since the non-magnetic material having a large particle size is incorporated in addition to the magnetite having a small particle size, cracks are unlikely to occur in the magnetite-containing resin after being cured. Furthermore, since the non-magnetic material is silica having a low coefficient of thermal expansion, even if the magnetite-containing resin is subjected to thermal shock, expansion is small, and cracks are unlikely to occur in the magnetite-containing resin. Furthermore, since the shape of the silica particles is spherical, an excellent filling property is exhibited, and the filling amount can be increased, resulting in an increase in the effect of preventing occurrence of cracks.

The coil according to this embodiment was subjected to a thermal shock test. Specifically, the coil was placed in a test chamber, and after a cycle of −40° C. to 130° C. was repeated 1,000 cycles, the coil was taken out of the test chamber. Occurrence of cracks was visually checked. Even after 1,000 cycles, no cracks occurred in the coil (n=10).

In the magnetite-containing resin according to this embodiment, magnetite alone is used as the magnetic material. However, the requirement is that the magnetic material at least partially includes magnetite. For example, the magnetite may be partially replaced with NiZnCu ferrite.

EXPERIMENTAL EXAMPLES

The following experiments were conducted in order to confirm the effectiveness embodiments according to the present disclosure.

Experimental Example 1

Direct Current Superposition Characteristic of Coil Coated with Resin

The direct current superposition characteristic was measured on a coil (100) according to the first embodiment, a coil according to the second embodiment, and a coil according to a comparative example outside the range of the present disclosure. The direct current superposition characteristic was measured by a method in which while gradually increasing the current up to 3.0 A using an external DC power source, the change in inductance was measured using an HP4291A.

FIG. 3 shows the measurement results. In the graph of FIG. 3, the solid line represents the direct current superposition characteristic of the coil according to the first embodiment, the broken line represents the direct current superposition characteristic of the coil according to the second embodiment, and the dotted chain line represents the direct current superposition characteristic of the coil according to the comparative example.

In the coil according to the first embodiment, which is coated with the resin containing 60% by weight of magnetite, the inductance does not decrease until the DC superposition current increases to 1.0 A, and thus a good direct current superposition characteristic is obtained (solid line). The reason for this is believed to be that the magnetite ($Fe_3O_4$) having a high saturation magnetization (Bs) is used as the magnetic material to be incorporated into the resin.

In the coil according to the second embodiment, which is coated with the resin containing 30% by weight of magnetite and 30% by weight of NiZnCu ferrite, a good direct current superposition characteristic, although slightly inferior to that of the coil according to the first embodiment, is obtained with no practical problem (broken line). The reason for this is believed to be that the magnetite having a high saturation magnetization (Bs) prevents the magnetic saturation of the coil.

On the other hand, in the comparative example, the coil was coated with a resin containing 40% by weight of an epoxy resin and 60% by weight of NiZnCu ferrite with a particle size D50 of 1.24 and a particle size D90 of 14.30. Other than this, the structure of the coil of the comparative example was the same as that of the coil 100 according to the first embodiment.

The saturation magnetization (Bs) of the NiZnCu ferrite used in the comparative example was 59 $Am^2/Kg$. The residual magnetic flux density (Br) was 1.5 $Am^2/Kg$, and the coercive force (Hc) was 2.3 kA/m.

In the coil according to the comparative example, the inductance decreases with increasing DC superposition current, thus exhibiting a poor direct current superposition characteristic (dotted chain line). The reason for this is believed to be that NiZnCu ferrite having a lower saturation magnetization (Bs) than that of magnetite is used as the magnetic material incorporated into the resin.

The coil according to the comparative example had an initial inductance of 4.9 µH and a Q value of 27, each of which was within the acceptable range.

Experimental Example 2

Inductance and Q Value of Coil Coated with Resin

Coils each coated with a resin not containing a magnetic material, a resin containing a magnetic material other than magnetite, a magnetite-containing resin within the ranges of the present disclosure, or a magnetite-containing resin outside the ranges of the present disclosure were produced, and coil properties (inductance and Q value) thereof were measured. In this experiment, 10 coils were produced for each type of coil, and properties were obtained by calculating the averages thereof (the same applies to Experimental Examples 3 and 4).

That is, an epoxy resin not containing a magnetic material (Sample 1), epoxy resins each containing one of two NiZnCu ferrites having different particle sizes (Samples 2 and 3), and epoxy resins each containing one of eight magnetites having different particle sizes (Samples 4 to 11) were prepared. Coils having the same structure as that of the coil 100 shown in FIG. 1, each coated with one of these resins, were produced, and coil properties thereof were measured. Table 1 shows the composition ratio of resin to magnetic material powder, properties of magnetic material powder, and coil properties (inductance and Q value).

TABLE 1

(Case where resin is used for coating of coil)

| | Resin | Magnetic material powder | Composition ratio Resin: Magnetic material powder (wt %) | Magnetic material powder properties | | | | | Coil properties | |
|---|---|---|---|---|---|---|---|---|---|---|
| | | | | Particle size D50 μm | Particle size D90 μm | Saturation magnetization Am²/kg | Residual magnetic flux density Am²/kg | Coercive force kA/m | L value μH | Q value |
| *Sample 1 | Epoxy resin | None | 100:0 | — | — | — | — | — | 3.2 | 19 |
| *Sample 2 | Epoxy resin | NiZnCu ferrite | 40:60 | 1.24 | 14.30 | 59 | 1.5 | 2.3 | 4.9 | 27 |
| *Sample 3 | Epoxy resin | NiZnCu | 40:60 | 1.60 | 6.80 | 76 | 4.5 | 3.3 | 4.8 | 27 |
| Sample 4 | Epoxy resin | Magnetite | 40:60 | 0.20 | 0.49 | 91 | 1.9 | 2.0 | 4.7 | 34 |
| Sample 5 | Epoxy resin | Magnetite | 40:60 | 0.39 | 0.58 | 90 | 4.0 | 4.2 | 4.9 | 35 |
| Sample 6 | Epoxy resin | Magnetite | 40:60 | 0.52 | 1.02 | 91 | 9.1 | 8.3 | 4.7 | 34 |
| Sample 7 | Epoxy resin | Magnetite | 40:60 | 0.81 | 1.60 | 90 | 10.2 | 9.8 | 4.8 | 35 |
| Sample 8 | Epoxy resin | Magnetite | 40:60 | 0.99 | 1.95 | 91 | 14.8 | 11.9 | 4.9 | 34 |
| *Sample 9 | Epoxy resin | Magnetite | 40:60 | 0.92 | 2.11 | 91 | 15.3 | 12.3 | 4.6 | 20 |
| *Sample 10 | Epoxy resin | Magnetite | 40:60 | 1.10 | 2.29 | 89 | 16.3 | 12.7 | 3.5 | 19 |
| *Sample 11 | Epoxy resin | Magnetite | 40:60 | 1.30 | 2.42 | 91 | 18.5 | 13.5 | 3.3 | 19 |

*Outside the ranges of the present disclosure

Samples 1 to 3 are outside the ranges of the present disclosure because magnetite is not incorporated into the resin. Samples 9 to 11 are outside the ranges of the present disclosure because the particle sizes of the magnetite incorporated are outside the ranges. Samples 4 to 8 are within the ranges of the present disclosure. Note that Sample 7 corresponds to the first embodiment described above, and Sample 2 corresponds to the comparative example in Experimental Example 1 described above.

In the coil coated with Sample 1, since a magnetic material is not incorporated into the resin, a quasi-closed magnetic circuit is not formed, but an open magnetic circuit is formed. Thus, the initial inductance is low at 3.2 μH.

In Samples 2 and 3, NiZnCu ferrite having a lower saturation magnetization (Bs) than that of magnetite is used. Therefore, the coils coated with Sample 2 or 3 have a poor direct current superposition characteristic (refer to the comparative example in the graph of FIG. 2).

In Samples 9 to 11, the particle sizes of the magnetite are outside the ranges of the present disclosure, and the residual magnetic flux density (Br) and the coercive force (Hc) are high. Therefore, the coils coated with one of Samples 9 to 11 have a small Q value of 19 to 20.

In Samples 4 to 8 according to the present disclosure, magnetite having a high saturation magnetization (Bs) is used. Therefore, the coils coated with one of Samples 4 to 8 have a good direct current superposition characteristic (refer to the first embodiment in the graph of FIG. 2). Furthermore, the magnetite has a particle size D50 of less than 1.0 μm, a particle size D90 of less than 2.0 μm, a residual magnetic flux density (Br) of less than 15 Am²/kg, and a coercive force of less than 12 kA/m. Therefore, the coils coated with one of Samples 4 to 8 have a large Q value of 34 to 35.

Experimental Example 3

Inductance and Q Value of Coil Including Core Composed of Resin

Using Samples 1 to 11, ring cores were produced. By winding wirings around the ring cores, coils were produced, the coils having the same structure as that of the coil 200 according to the third embodiment shown in FIG. 2. Coil properties (inductance and Q value) were measured. Table 2 shows the composition ratio of resin to magnetic material powder, properties of magnetic material powder, and coil properties (inductance and Q value).

TABLE 2

(Case where resin is used for core of coil)

| | Resin | Magnetic material powder | Composition ratio Resin: Magnetic material powder (wt %) | Magnetic material powder properties | | | | | Coil properties | |
|---|---|---|---|---|---|---|---|---|---|---|
| | | | | Particle size D50 μm | Particle size D90 μm | Saturation magnetization Am²/kg | Residual magnetic flux density Am²/kg | Coercive force kA/m | L value μH | Q value |
| *Sample 1 | Epoxy resin | None | 100:0 | — | — | — | — | — | 3.5 | 30 |

TABLE 2-continued (Case where resin is used for core of coil)

| | | Composition ratio | | Magnetic material powder properties | | | | Coil properties | |
|---|---|---|---|---|---|---|---|---|---|
| | Resin | Magnetic material powder | Resin: Magnetic material powder (wt %) | Particle size D50 μm | Particle size D90 μm | Saturation magnetization Am²/kg | Residual magnetic flux density Am²/kg | Coercive force kA/m | L value μH | Q value |
| *Sample 2 | Epoxy resin | NiZnCu ferrite | 40:60 | 1.24 | 14.30 | 59 | 1.5 | 2.3 | 4.4 | 33 |
| *Sample 3 | Epoxy resin | NiZnCu ferrite | 40:60 | 1.60 | 6.80 | 76 | 4.5 | 3.3 | 4.4 | 32 |
| Sample 4 | Epoxy resin | Magnetite | 40:60 | 0.20 | 0.49 | 91 | 1.9 | 2.0 | 4.3 | 52 |
| Sample 5 | Epoxy resin | Magnetite | 40:60 | 0.39 | 0.58 | 90 | 4.0 | 4.2 | 4.4 | 50 |
| Sample 6 | Epoxy resin | Magnetite | 40:60 | 0.52 | 1.02 | 91 | 9.1 | 8.3 | 4.3 | 46 |
| Sample 7 | Epoxy resin | Magnetite | 40:60 | 0.81 | 1.60 | 90 | 10.2 | 9.8 | 4.3 | 43 |
| Sample 8 | Epoxy resin | Magnetite | 40:60 | 0.99 | 1.95 | 91 | 14.8 | 11.9 | 4.4 | 45 |
| *Sample 9 | Epoxy resin | Magnetite | 40:60 | 0.92 | 2.11 | 91 | 15.3 | 12.3 | 4.1 | 29 |
| *Sample 10 | Epoxy resin | Magnetite | 40:60 | 1.10 | 2.29 | 89 | 16.3 | 12.7 | 3.8 | 28 |
| *Sample 11 | Epoxy resin | Magnetite | 40:60 | 1.30 | 2.42 | 91 | 18.5 | 13.5 | 3.6 | 25 |

*Outside the ranges of the present disclosure

Samples 1 to 3 are outside the ranges of the present disclosure because magnetite is not incorporated into the resin. Samples 9 to 11 are outside the ranges of the present disclosure because the particle sizes of the magnetite incorporated are outside the ranges. Samples 4 to 8 are within the ranges of the present disclosure.

In the coil including the ring core composed of Sample 1, since a magnetic material is not incorporated into the resin, a closed magnetic circuit is not formed, but an open magnetic circuit is formed. Thus, the initial inductance is low at 3.5 μH.

In Samples 2 and 3, NiZnCu ferrite having a lower saturation magnetization (Bs) than that of magnetite is used. Therefore, the coils including the ring core composed of Sample 2 or 3 have a poor direct current superposition characteristic.

In Samples 9 to 11, the particle sizes of the magnetite are outside the ranges of the present disclosure, and the residual magnetic flux density (Br) and the coercive force (Hc) are high. Therefore, the coils including the ring core composed of one of Samples 9 to 11 have a small Q value of 25 to 29.

In Samples 4 to 8 according to the present disclosure, magnetite having a high saturation magnetization (Bs) is used. Therefore, the coils including the ring core composed of one of Samples 4 to 8 have a good direct current superposition characteristic.

Furthermore, the magnetite has a particle size D50 of less than 1.0 μm, a particle size D90 of less than 2.0 μm, a low residual magnetic flux density (Br), and a low coercive force (Hc). Therefore, the coils including the ring core composed of one of Samples 4 to 8 have a large Q value of 43 to 52.

Experimental Example 4

Thermal Shock Test of Coil Coated with Resin Additionally Containing Spherical Silica The thermal shock resistance of magnetite-containing resins, each containing a non-magnetic material in addition to a magnetic material (which at least partially included magnetite), was examined while changing the particle size ratio between the magnetic material and the non-magnetic material.

Specifically, two types of magnetic material, i.e., a magnetite with a particle size D50 of 0.81 μm and a particle size D90 of 1.60 μm and a magnetite with a particle size D50 of 0.94 μm and a particle size D90 of 1.98 μm, were prepared, and seven types of non-magnetic material, from a spherical silica with a particle size D50 of 1.30 μm and a particle size D90 of 2.00 μm to a spherical silica with a particle size D50 of 7.0 μm and a particle size D90 of 17.00 μm, were prepared.

By stirring 10% by weight of a bisphenol A epoxy resin, 60% by weight of one magnetite selected from the above, and 30% by weight of one spherical silica selected from the above, 12 magnetite-containing resins containing spherical silica were produced (Samples 12 to 23).

Coils each coated with one of the magnetite-containing resins were produced, and the coil properties (inductance and Q value) thereof were measured.

Furthermore, the coils were subjected to a thermal shock test to examine thermal shock resistance. In the thermal shock test, a coil was placed in a test chamber, and after a cycle of −40° C. to 130° C. was repeated 1,000 cycles, the coil was taken out of the test chamber. Occurrence of cracks was visually checked. The test was conducted on 10 coils for each sample. In the case where cracks occurred in even one coil, the sample was evaluated as "cracks occurred", and in the case where cracks did not occur in all of the coils, the sample was evaluated as "no cracks occurred".

Table 3 shows the particle size ratio of the magnetic material (magnetite) to the non-magnetic material (spherical silica), the result of the thermal shock test, coil properties (inductance and Q value), and the like for Samples 12 to 23. As the particle size ratio of the magnetic material to the non-magnetic material, the ratio in terms of the particle size D90, i.e., the particle size ratio represented by the formula: particle size D90 of the magnetic material/particle size D90 of the non-magnetic material, was used.

TABLE 3

(Case where magnetite-containing resin containing spherical silica is used for coating of coil)

| | Resin | Magnetic material | Non-magnetic material | Composition ratio Resin: Magnetic material: Non-magnetic material (wt %) | Magnetic material D90 (μm) | Non-magnetic material D90 μm | Particle size ratio Magnetic material/Non-magnetic material | Thermal shock test −40⇔130° C. (1000 cycles) | Coil properties L value | Coil properties Q value |
|---|---|---|---|---|---|---|---|---|---|---|
| Sample 12 | Epoxy resin | Magnetite | Spherical silica | 10:60:30 | 1.98 | 17.0 | 0.12 | No cracks occurred | 4.7 | 38 |
| Sample 13 | Epoxy resin | Magnetite | Spherical silica | 10:60:30 | 1.98 | 15.0 | 0.13 | No cracks occurred | 4.9 | 39 |
| Sample 14 | Epoxy resin | Magnetite | Spherical silica | 10:60:30 | 1.98 | 10.2 | 0.19 | No cracks occurred | 4.7 | 37 |
| Sample 15 | Epoxy resin | Magnetite | Spherical silica | 10:60:30 | 1.98 | 7.50 | 0.26 | No cracks occurred | 4.8 | 38 |
| Sample 16 | Epoxy resin | Magnetite | Spherical silica | 10:60:30 | 1.98 | 5.00 | 0.40 | No cracks occurred | 4.9 | 38 |
| Sample 17 | Epoxy resin | Magnetite | Spherical silica | 10:60:30 | 1.98 | 3.40 | 0.58 | Cracks occurred | 4.6 | 39 |
| Sample 18 | Epoxy resin | Magnetite | Spherical silica | 10:60:30 | 1.98 | 2.00 | 0.99 | Cracks occurred | 4.8 | 37 |
| Sample 19 | Epoxy resin | Magnetite | Spherical silica | 10:60:30 | 1.60 | 15.0 | 0.11 | No cracks occurred | 4.7 | 39 |
| Sample 20 | Epoxy resin | Magnetite | Spherical silica | 10:60:30 | 1.60 | 10.2 | 0.16 | No cracks occurred | 4.8 | 38 |
| Sample 21 | Epoxy resin | Magnetite | Spherical silica | 10:60:30 | 1.60 | 5.00 | 0.32 | No cracks occurred | 4.8 | 38 |
| Sample 22 | Epoxy resin | Magnetite | Spherical silica | 10:60:30 | 1.60 | 3.40 | 0.47 | Cracks occurred | 4.9 | 39 |
| Sample 23 | Epoxy resin | Magnetite | Spherical silica | 10:60:30 | 1.60 | 2.00 | 0.80 | Cracks occurred | 4.7 | 38 |

The coils each coated with one of Samples 12 to 23 had an inductance of 4.6 to 4.9 μH and a Q value of 37 to 39, all of which were good.

In Samples 12 to 18, a magnetite with a particle size D90 of 1.98 and a spherical silica with a particle size D90 of 2.00 to 17.00 are combined. In the coils each coated with one of Samples 12 to 16 with a particle size ratio of 0.12 to 0.40, no cracks occurred. In the coils coated with Sample 17 with a particle size ratio of 0.58 or Sample 18 with a particle size ratio of 0.99, cracks occurred.

In Samples 19 to 23, a magnetite with a particle size D90 of 1.60 and a spherical silica with a particle size D90 of 2.00 to 15.00 are combined. In the coils each coated with one of Samples 19 to 21 with a particle size ratio of 0.11 to 0.32, no cracks occurred. In the coils coated with Sample 22 with a particle size ratio of 0.47 or Sample 23 with a particle size ratio of 0.80, cracks occurred.

As is evident from the above description, when the particle size ratio of the magnetic material to the non-magnetic material represented by the formula: particle size D90 of the magnetic material/particle size D90 of the non-magnetic material is 0.4 or less, thermal shock resistance is high, and cracks are unlikely to occur in the magnetite-containing resin after being cured.

In an embodiment in which a method uses a magnetite having a particle size D50 of less than 1.0 μm and a particle size D90 of less than 2.0 μm as the magnetite to be incorporated, it is possible to obtain the residual magnetic flux density and the coercive force.

In an embodiment in which the magnetite-containing resin contains, in addition to the magnetic material (which at least partially includes magnetite), a non-magnetic material, where the particle size ratio of the magnetic material to the non-magnetic material represented by the formula: particle size D90 of the magnetic material/particle size D90 of the non-magnetic material is 0.4 or less, because the magnetite used in the present disclosure has a small particle size, when the particles are packed at a high density, the thickness of the resin layer between the particles decreases, and the resin becomes susceptible to the difference in coefficient of thermal expansion between the magnetite and the resin. Consequently, cracks are likely to occur in the magnetite-containing resin after being cured. By incorporating a non-magnetic material having a large particle size, occurrence of cracks can be prevented.

In an embodiment where a non-magnetic material is incorporated into the magnetite-containing resin and the non-magnetic material is spherical silica, because silica is a material with a low coefficient of thermal expansion, even if the magnetite-containing resin is subjected to thermal shock after being cured, expansion is small, and cracks are unlikely to occur in the magnetite-containing resin. Further, when the silica particles are spherical in shape, the silica has an excellent filling property, and the filling amount can be increased, resulting in an increase in the effect of preventing occurrence of cracks. Moreover, in the case where, for example, crushed silica is used instead of spherical silica, it is difficult to interpose the magnetic material between silica particles, and there is a possibility that cracks will occur, originating from sharp fracture surfaces.

Since a magnetite-containing resin according to the present disclosure contains, as a magnetic material, a magnetite having a high saturation magnetization (Bs), when a coil or the like is coated with the magnetite-containing resin or when the magnetite-containing resin is used as a core of a coil or the like, even if a large direct current flows therethrough, magnetic saturation is unlikely to occur, and the inductance is unlikely to decrease. Consequently, it is possible to obtain an excellent direct current superposition characteristic. Furthermore, since the particle sizes of the magnetite are controlled to the ranges described above, the residual magnetic flux density (Br) and the coercive force (Hc) are suppressed to be low. Therefore, when a coil or the like is coated with the magnetite-containing resin or when the magnetite-containing resin is used as a core of a coil or the like, the Q value does not decrease.

What is claimed is:

1. An electronic component comprising:
a magnetite-containing resin comprising:
a resin; and
a powdery magnetic material incorporated into the resin,
wherein the magnetic material at least partially includes a magnetite having a residual magnetic flux density of less than 15 Am$^2$/kg and a coercive force of less than 12 kA/m;
a core composed of the magnetite-containing resin; and
a winding wound around the core or a pattern disposed on a surface of the core.

2. An electronic component coated with a magnetite-containing resin, wherein:
the magnetic-containing resin comprises a resin, and a powdery magnetic material incorporated into the resin; and
the magnetic material at least partially includes a magnetite having a residual magnetic flux density of less than 15 Am$^2$/kg and a coercive force of less than 12 kA/m.

3. The electronic component according to claim 2, wherein the magnetite has a particle size D50 of less than 1.0 μm and a particle size D90 of less than 2.0 μm.

4. The electronic component according to claim 2, wherein the magnetic material includes, in addition to the magnetite, NiZnCu ferrite.

5. The electronic component according to claim 3, wherein the magnetic material includes, in addition to the magnetite, NiZnCu ferrite.

6. The electronic component according to claim 2, wherein the content of the magnetic material is 50% to 95% by weight relative to the whole magnetite-containing resin.

7. The electronic component according to claim 3, wherein the content of the magnetic material is 50% to 95% by weight relative to the whole magnetite-containing resin.

8. The electronic component according to claim 4, wherein the content of the magnetic material is 50% to 95% by weight relative to the whole magnetite-containing resin.

9. The electronic component according to claim 5, wherein the content of the magnetic material is 50% to 95% by weight relative to the whole magnetite-containing resin.

10. The electronic component according to claim 2, wherein the magnetite-containing resin further comprises a non-magnetic material, wherein the particle size ratio of the magnetic material to the non-magnetic material represented by the formula: particle size D90 of the magnetic material/particle size D90 of the non-magnetic material is 0.4 or less.

11. The electronic component according to claim 3, wherein the magnetite-containing resin further comprises a non-magnetic material, wherein the particle size ratio of the magnetic material to the non-magnetic material represented by the formula: particle size D90 of the magnetic material/particle size D90 of the non-magnetic material is 0.4 or less.

12. The electronic component according to claim 4, wherein the magnetite-containing resin further comprises a non-magnetic material, wherein the particle size ratio of the magnetic material to the non-magnetic material represented by the formula: particle size D90 of the magnetic material/particle size D90 of the non-magnetic material is 0.4 or less.

13. The electronic component according to claim 10, wherein the non-magnetic material is spherical silica.

14. The electronic component comprising:
a core composed of the magnetite-containing resin according to claim 3; and
a winding wound around the core or a pattern disposed on a surface of the core.

15. The electronic component comprising:
a core composed of the magnetite-containing resin according to claim 4; and
a winding wound around the core or a pattern disposed on a surface of the core.

16. The electronic component comprising:
a core composed of the magnetite-containing resin according to claim 6; and
a winding wound around the core or a pattern disposed on a surface of the core.

17. The electronic component comprising:
a core composed of the magnetite-containing resin according to claim 10; and
a winding wound around the core or a pattern disposed on a surface of the core.

18. The electronic component according to claim 2, wherein the electronic component is a coil or a noise filter.

* * * * *